(12) United States Patent
Todokoro

(10) Patent No.: US 11,412,101 B2
(45) Date of Patent: Aug. 9, 2022

(54) IMAGE FORMING APPARATUS INCLUDING DUCT PROVIDED WITH FILTER

(71) Applicant: KYOCERA Document Solutions Inc., Osaka (JP)

(72) Inventor: Ryotaro Todokoro, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 137 days.

(21) Appl. No.: 16/939,477

(22) Filed: Jul. 27, 2020

(65) Prior Publication Data

US 2021/0037154 A1    Feb. 4, 2021

(30) Foreign Application Priority Data

Jul. 31, 2019 (JP) .............................. JP2019-140892

(51) Int. Cl.
  *H04N 1/00* (2006.01)
  *B65H 31/24* (2006.01)
  *B65H 31/02* (2006.01)

(52) U.S. Cl.
  CPC ......... *H04N 1/00631* (2013.01); *B65H 31/02* (2013.01); *B65H 31/24* (2013.01)

(58) Field of Classification Search
  CPC .................................................. H04N 1/00631
  USPC ............................................. 358/1.15, 1.12
  See application file for complete search history.

(56) References Cited

U.S. PATENT DOCUMENTS

| 8,218,157 B2 | 7/2012 | Saito | |
|---|---|---|---|
| 8,228,513 B2 | 7/2012 | Saito | |
| 2005/0207951 A1* | 9/2005 | Lee | A61L 9/015 422/186.07 |
| 2011/0211859 A1* | 9/2011 | Shimoyama | G03G 15/2064 399/93 |
| 2014/0294429 A1* | 10/2014 | Inui | G03G 21/105 399/99 |
| 2015/0168912 A1* | 6/2015 | Mizuno | G03G 21/206 399/93 |
| 2019/0011879 A1* | 1/2019 | Miyazaki | G03G 15/2017 |

FOREIGN PATENT DOCUMENTS

JP        2007188043 A      7/2007

* cited by examiner

*Primary Examiner* — Jacky X Zheng
(74) *Attorney, Agent, or Firm* — Studebaker & Brackett PC

(57) ABSTRACT

An image forming apparatus includes a duct, a filter provided inside the duct, a first fan provided on an upstream side of the filter in an exhaust direction and a second fan provided on a downstream side of the filter in the exhaust direction. A first mode operation containing a first operation in which the first fan sends air to the filter and a second operation in which the second fan sends air to the filter after the first operation is performed at least once, and then a second mode in which the first fan sends air in the exhaust direction is performed.

15 Claims, 8 Drawing Sheets

IMAGE FORMING APPARATUS INCLUDING DUCT PROVIDED WITH FILTER

INCORPORATION BY REFERENCE

This application is based on and claims the benefit of priority from Japanese Patent application No. 2019-140892 filed on Jul. 31, 2019, which is incorporated by reference in its entirety.

TECHNICAL FIELD

The present disclosure relates to an image forming apparatus which forms an image on a sheet.

BACKGROUND

Inside an electrophotographic type printer, odorous substance, such as volatile organic compound generated by heating of a toner and paper powder, is generated. Then, a technique to collect the odorous substance generated inside the printer is discussed. For example, a suction and exhaust means to suck air emitted from a discharged recording medium and then to discharge the sucked air through a filter may be provided on a recording medium placement part so as to be along a direction perpendicular to a discharge direction of the recording medium and along a direction parallel to the surface of the recording medium.

Effectiveness of the filter for decreasing the odorous substance is revealed when the odorous substance touches the filter and is adhered to it. Therefore, as a number of time where the odorous substance touches the filter is increased, the higher effectiveness can be obtained. However, in the above technique, the odorous substance passes through the filter only once. Then, the air from which the odorous substance is not removed sufficiently may be discharged outside the printer.

SUMMARY OF THE INVENTION

In accordance with one aspect of the present disclosure, an image forming apparatus includes a duct, a filter provided inside the duct, a first fan provided on an upstream side of the filter in an exhaust direction and a second fan provided on a downstream side of the filter in the exhaust direction. A first mode operation containing a first operation in which the first fan sends air to the filter and a second operation in which the second fan sends air to the filter after the first operation is performed at least once, and then a second mode in which the first fan sends air in the exhaust direction is performed.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
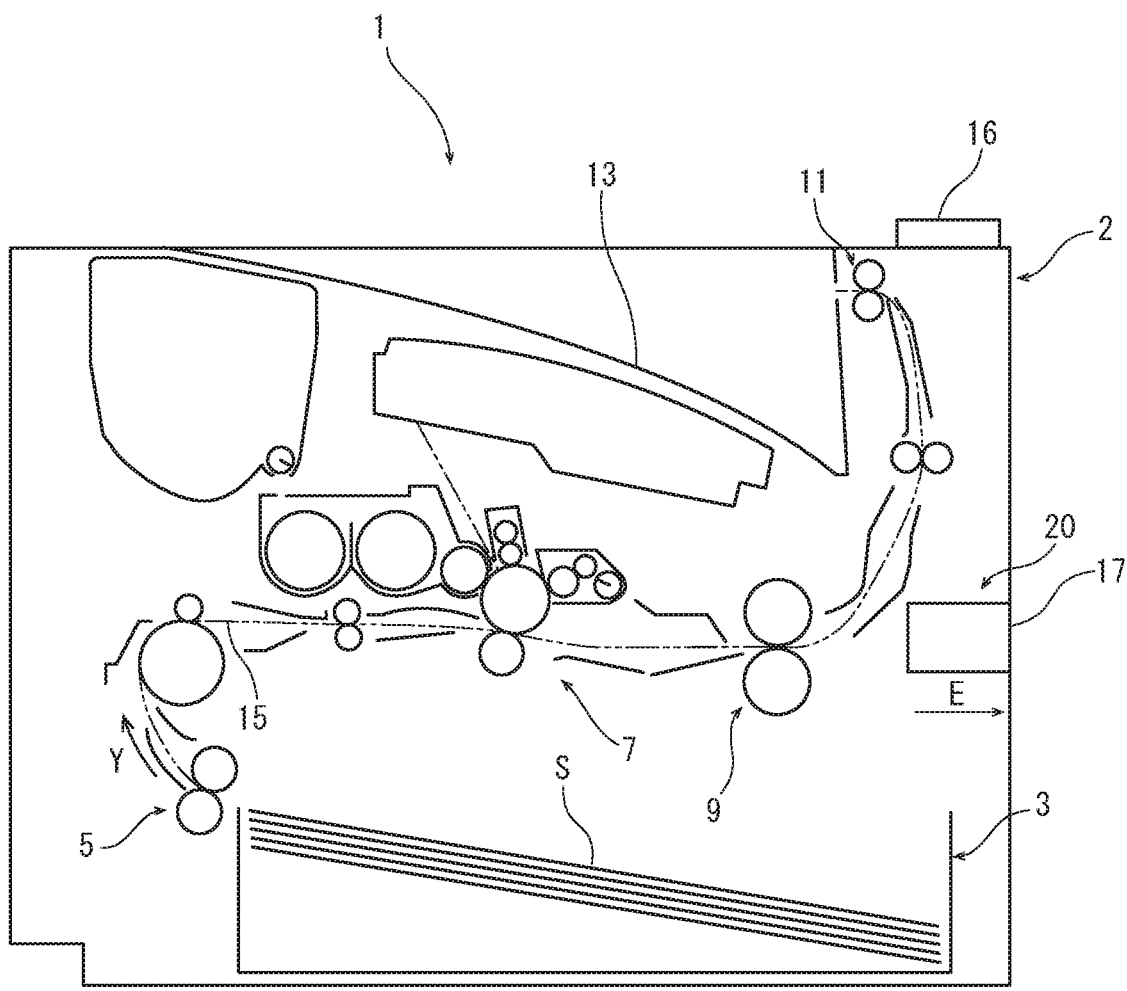
FIG. 1 is a front view schematically showing an inner structure of a printer according to one embodiment of the present invention.
Figure 1:
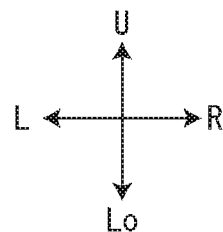

Hereinafter, with reference to the attached drawings, a printer 1 (an example of an image forming apparatus) and an exhaust device 20 according to one embodiment of the present disclosure will be described. FIG. 1 is a front view schematically showing an inner structure of the printer 1. Hereinafter, a front side of a paper surface on which FIG. 1 is drawn is defined as a front side of the printer 1, and the left-and-right direction is based on a direction in which the printer 1 is shown from the front side. "U", "Lo", "L", "R", "Fr" and "Rr" marked in each figure respectively show "upper", "lower", "left", "right", "front" and "rear".

The printer 1 includes a casing 2 formed into a parallelepiped shape. In the casing 2, a sheet feeding cassette 3 in which a sheet S is stored, a sheet feeding device 5 which feeds the sheet S from the sheet feeding cassette 3, an image forming part 7 which forms a toner image on the sheet S in an electrophotographic manner, a fixing device 9 which heats the toner image to be fixed on the sheet S, a discharge device 11 which discharges the sheet S and a discharge tray 13 on which the discharged sheet S is stacked are provided. In the casing 2, a conveyance path 15 for the sheet S is formed from the sheet feeding device 5 through the image forming part 7 and the fixing device 9 to the discharge device 11. The sheet S is conveyed along the conveyance path 15 in a predetermined conveyance direction Y.

Next, an image forming operation of the printer 1 will be described. When the printer 1 receives an image forming instruction from an external computer, the sheet feeding device 5 feeds the sheet S having a size instructed by the image forming instruction to the conveyance path 15, and the image forming part 7 forms a toner image on the sheet S according to an image data contained in the image forming instruction. The sheet S is conveyed to the fixing device 9, and then the toner image is fixed to the sheet S. The sheet S on which the toner image is fixed is discharged by the discharge device 11 on the discharge tray 13.

Figure 2:
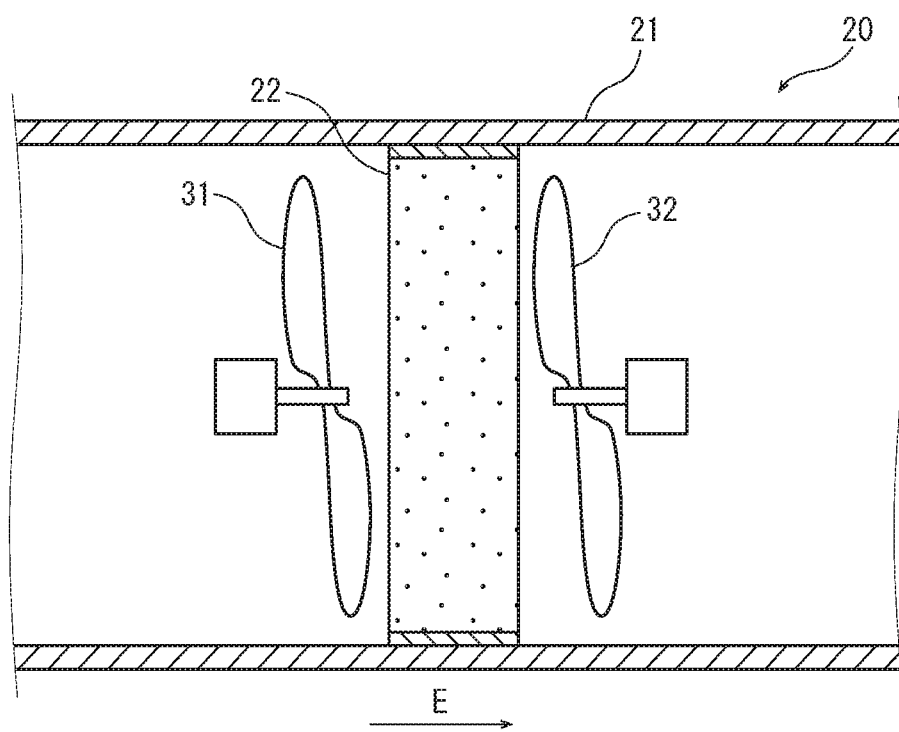
FIG. 2 is a sectional view showing an exhaust device according to the embodiment of the present invention.

Next, with reference to FIG. 2, a configuration of the exhaust device 20 will be described. FIG. 2 is a sectional view showing the exhaust device 20. The exhaust device 20 includes a duct 21, a filter 22 provided in the duct 21, a first fan 31 provided on an upstream side of the filter 22 in an exhaust direction E and a second fan 32 provided on a downstream side of the filter 22 in the exhaust direction E. In the following description, "upstream side" and "downstream side" respectively show the upstream side and the downstream side in the exhaust direction E of the exhaust device 20.

The duct 21 is a pipe made of resin or metal, for example, and guides air inside the printer 1 from the fixing device 9 and its periphery to an outside of the casing 2. The upstream side end portion of the duct 21 is disposed near the fixing device 9 and the downstream side end portion of the duct 21 is connected to an exhaust port 17 (refer to FIG. 1) formed in the casing 2.

The filter 22 is made of, for example, woven fabric or nonwoven fabric of active carbon fiver, glass fiver or the like, and disposed inside the duct 21. The filter 22 absorbs odorous substance contained in the air.

The first fan 31 and the second fan 32 are provided inside the duct 21. The first fan 31 is disposed on the upstream side of the filter 22. The second fan 32 is disposed on the downstream side of the filter 22. The first fan 31 and the second fan 32 are adjacent to the filter 22. The first fan 31 is driven by a driving source such as a motor, and sends air in the exhaust direction E. The second fan 32 sends air in an opposite direction to the exhaust direction E of the first fan 31.

Figure 3:
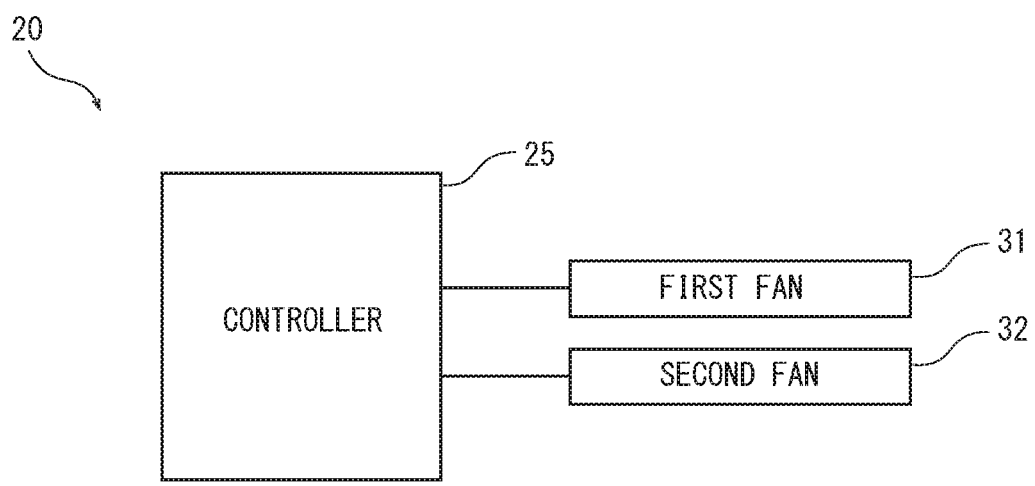
FIG. 3 is a block diagram showing an electric system of the exhaust device according to the embodiment of the present invention.

Next, with reference to FIG. 3, an electric system of the exhaust device 20 will be described. FIG. 3 is a block diagram showing the electric system of the exhaust device 20. The exhaust device 20 includes a controller 25 to which the first fan 31 and the second fan 32 are connected. The controller 25 includes an arithmetic device such as a central processing unit (CPU) and a storage such as a random access memory (RAM) and a read only memory (ROM), and controls each part of the exhaust device 20 by using control program and control data stored in the storage.

The controller 25 performs a first mode operation at least once and a second mode operation after the first mode operation. The first mode operation contains a first operation in which the first fan 31 sends air to the filter 22 and a second operation in which the second fan 32 sends air to the filter 22 after the first operation. In the second mode operation, the first fan 31 send air to the filter 22 in the exhaust direction E.

In the first operation of the first mode operation, the second fan 32 does not send air. In the second operation of the first mode operation, the first fan 31 does not send air. A time of period where the first fan 31 and the second fan 32 send air to the filter in the first mode operation is previously determined. For example, the first fan 31 may send air to the filter 22 for 5 seconds and then the second fan 32 may send air to the filter 22 for 5 seconds.

Figure 4:
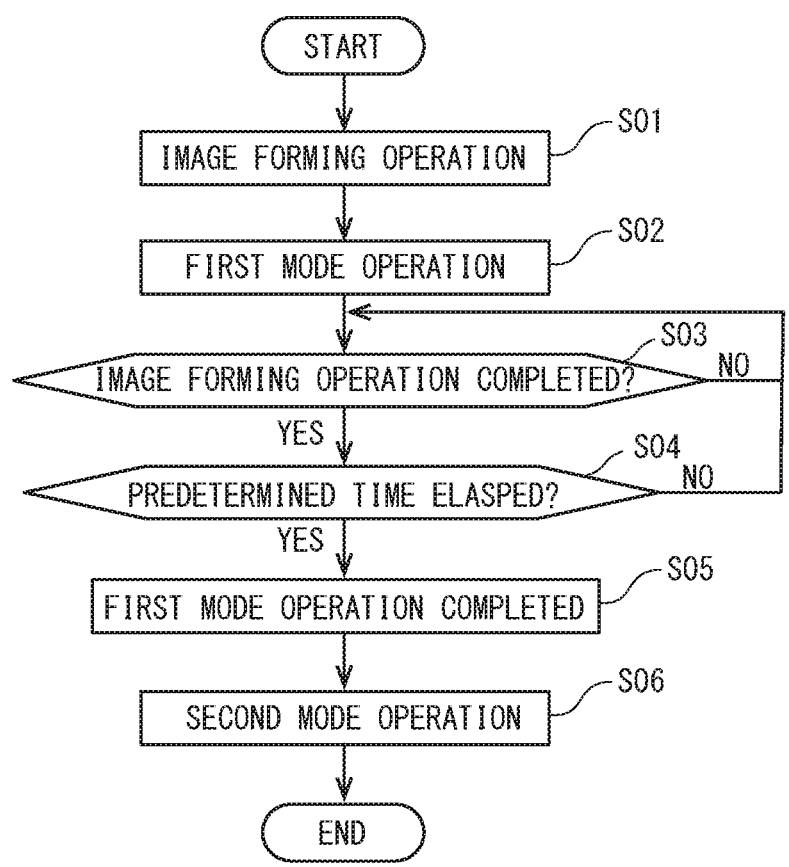
FIG. 4 is a flow diagram showing an operation of the exhaust device according to the embodiment of the present disclosure.

Next, with reference to FIG. 4, an operation of the exhaust device 20 will be described. FIG. 4 is a flow diagram showing the operation of the exhaust device 20. When the printer 1 receives the image forming instruction from the external computer, the controller 25 performs the following processes.

Firstly, the printer 1 starts the image forming operation (step S01). Then, the controller 25 controls the exhaust device 20 to be driven in the first mode operation (step S02). Next, the controller 25 determines whether the image forming operation is completed (step S03). When it is determined that the image forming operation is not completed (step S03: NO), the controller 25 repeats the process of step S03. On the other hand, when it is determined that the image forming operation is completed (step S03: YES), the controller 25 shifts the process to step S04.

In step S04, the controller 25 determines whether a predetermined time elapses after the completion of the image forming operation. When it is determined that the predetermined time does not elapse (step S04: NO), the controller 25 returns the process to step S03. On the other hand, when it is determined that the predetermined time elapses (step S04: YES), the controller 25 shifts the process to step S05, and completes the first mode operation.

Finally, the controller 25 performs the second mode operation for a predetermined time (step S06). In the second mode operation, air from which odorous substance is removed is discharged through the exhaust port 17.

Here, an amount of the odor substance collected by the first mode operation will be described. For example, it is assumed that a collection efficiency of the odorous substance when the air containing the odorous substance passes through the filter 22 is 50%. The collection efficiency is a rate of an amount of the odorous substance collected by the filter 22 to an amount of the odorous substance before passing through the filter 22. By the air sending of the first fan 31 to the filter 22, the air passes the filter 22 rightward. At this time, because 50% of an initial amount (an amount of the odorous substance contained in the air which does not pass through the filter 22 before) is collected, an amount of the odorous substance remaining in the air is 50% of the initial amount. Next, by the air sending of the second fan 32 to the filter 22, the air passes the filter 22 leftward. At this time, because 50% of the odorous substance having an amount of 50% of the initial amount is collected, an amount of the odorous substance remaining in the air is 25% of the initial amount. For example, if the first mode operation is performed twice, an amount of the odorous substance remaining in the air is 6.25% of the initial amount. If the first mode operation is performed for three times, an amount of the odorous substance remaining in the air is 1.56% of the initial amount.

According to the exhaust device 20 according to the above described present embodiment, compared with a case where the first mode operation is not performed, it becomes possible to heighten an effect for removing the odorous substance from the exhaust air.

Additionally, when the first fan 31 sends air to the filer 22 in the first mode operation, the second fan 32 does not send air while when the second fan 32 sends air to the filter 22 in the first mode operation, the first fan 31 does not send air. According to the configuration, because a time where the air containing the odorous substance remains in a space between the first fan 31 and the second fan 32 increases, it becomes possible to heighten the effect form removing the odorous substance. As a result, even if the casing 2 of the printer 1 has low sealing performance, it becomes possible to decrease an amount of the odorous substance leaking outside the casing 2.

According to the exhaust device 20 according to the present embodiment, because the exhaust is performed after a predetermined time elapses from the completion of the image forming operation, it becomes possible to decrease discomfort feeling felt by a user owing to the odor contained in the exhaust.

The above embodiment may be modified as follows.

Figure 5:
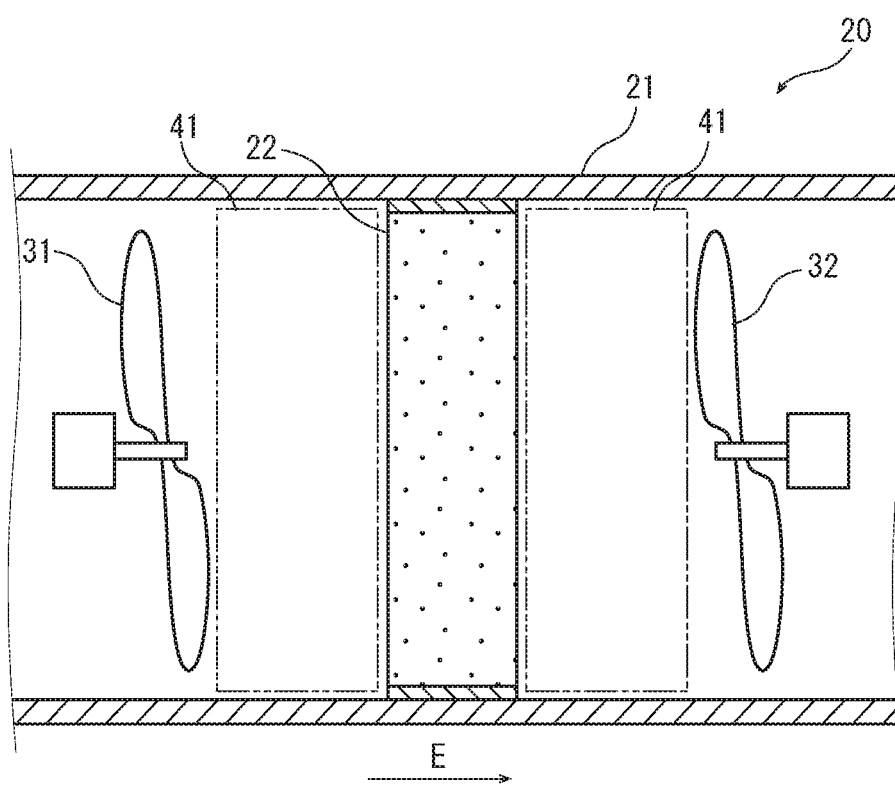
FIG. 5 is a sectional view showing the exhaust device according to a modified example of the embodiment of the present disclosure.

The above embodiment shows an example where the first fan 31 and the second fan 32 are adjacent to the filter 22. However, as shown in FIG. 5 (a sectional view showing the exhaust device 20 according to the modified example), a first collection space 41 (an example of a collection space) may be provided between the first fan 31 and the filter 22, and a second collection space 42 (an example of a collection space) may be provided between the filter 22 and the second fan 32. According to the configuration, compared with the above embodiment, because a time where the air containing the odorous substance remains in a space between the first fan 31 and the second fan 32 is increased, it becomes possible to heighten the efficiency for removing the odorous substance. As a result, even if the casing 2 of the printer 1 has low sealing performance, it becomes possible to decrease an amount of the odorous substance leaking outside the casing 2.

The above embodiment shows an example where the second fan 32 does not send air in the first operation and the first fan 31 does not send air in the second operation. However, it may be configured such that the second fan 32 sends air to the filter 22 with wind force lower than the first fan 31 in the first operation and the first fan 31 sends air to the filter 22 with wind force lower than the second fan 32 in the second operation of the first mode. Specifically, in the first operation, the second fan 32 sends air at such a wind force that the air sent by the first fan 31 does not flow back to the filter 22. In the second operation, the first fan 31 sends air at such a wind force that the air sent by the second fan 32 does not flow back to the filter 22. According to the configuration, because the air containing the odorous substance easily remains in a space between the first fan 31 and the second fan 32, it becomes possible to heighten the efficiency for removing the odorous substance. As a result, even if the casing 2 of the printer 1 has low sealing performance, it becomes possible to decrease an amount of the odorous substance leaking outside the casing 2.

The above embodiment shows an example where the second mode operation is started after a predetermined time elapses from the completion of the image forming operation. However, it may be configured such that the predetermined time is changed according to an operation using an operation part 16 (refer to FIG. 1) provided in the printer 1. The operation part 16 includes a liquid crystal display panel and a touch panel, for example, and displays an operation menu for operation the exhaust device 20 and receives the operation for the exhaust device 20. The controller 25 changes the predetermined time according to the received operation.

Figure 6:
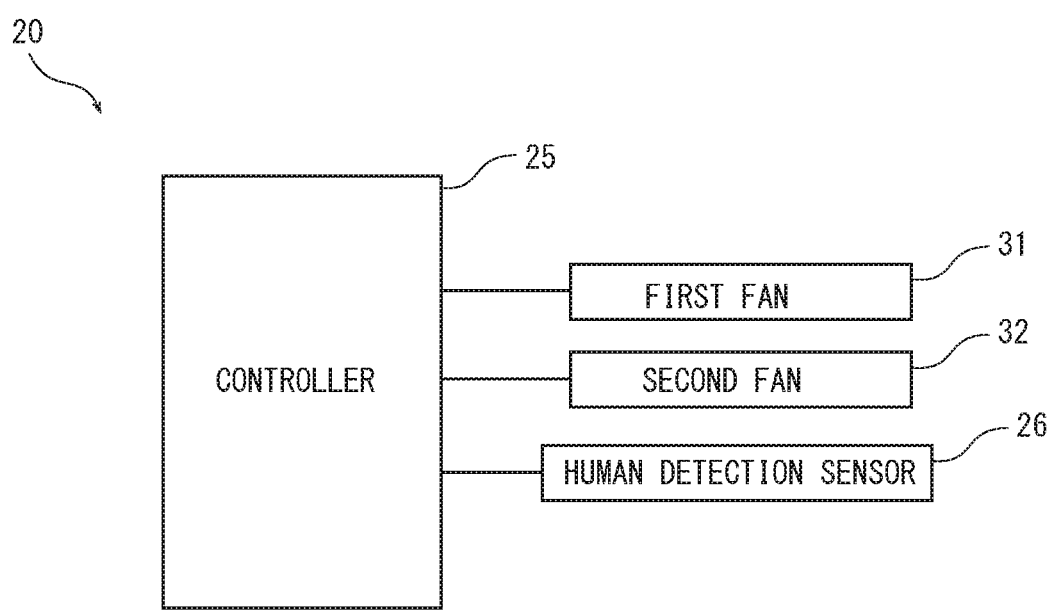
FIG. 6 is a block diagram showing an electric system of the exhaust device according to the modified example of the embodiment of the present disclosure.
Figure 7:
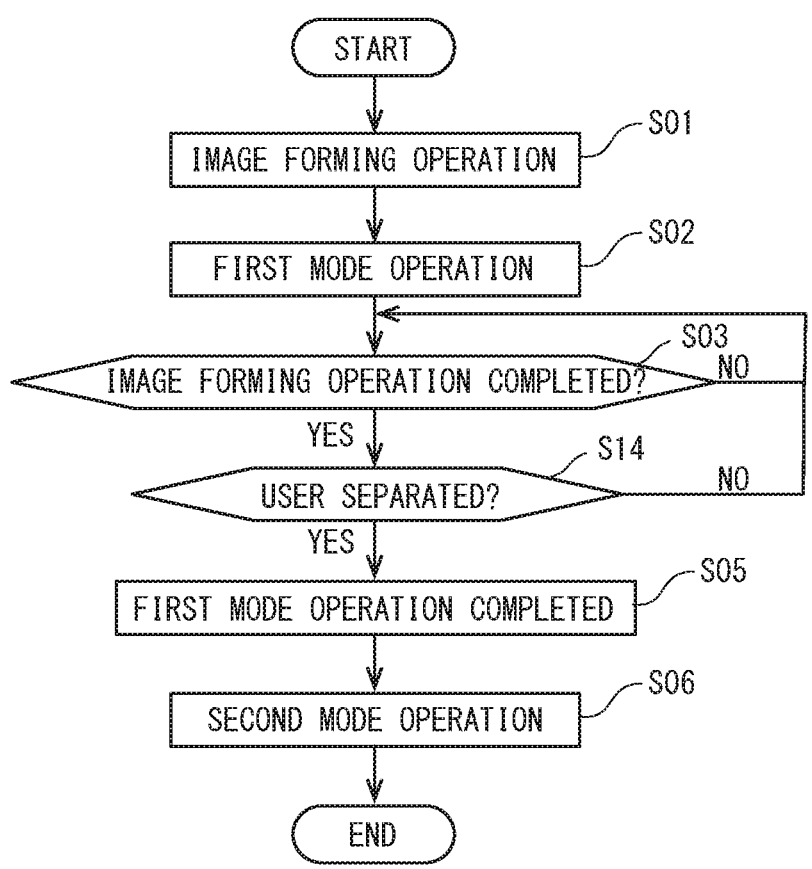
FIG. 7 is a flow diagram showing an operation of the exhaust device according to the modified example of the embodiment of the present disclosure.

The above embodiment shows an example where the second mode operation is started after a predetermined time elapses from the completion of the image forming operation. However, the second mode operation may be started based on a detection result of a human detection sensor 26 shown in FIG. 6 (a block diagram showing an electric system of the exhaust device 20 according to the modified example). The human detection sensor 26 detects a user within a predetermined range from the printer 1 by using reflection of infrared ray, for example. FIG. 7 is a flow diagram showing an operation of the exhaust device 20 according to the modified example. The controller 25 performs a process in step S14 in place of step S04. In step S14, the controller 25 determines whether the user separates away from the printer 1, based on the detection result of the human detection sensor 26. When the human detection sensor 26 detects the user, the controller 25 determines that the user does not separate away from the printer (step S14: NO), and returns the process to step S02. On the other hand, when the human detection sensor 26 does not detect the user, the controller 25 determines that the user separates away from the printer (step S14: YES), and performs the second mode operation (step S05). According to the configuration, because the second mode operation is performed when the user separates away from the printer 1, compared with the above embodiment, it becomes possible to decrease discomfort feeling felt by the user owing to the odor contained in the exhaust.

Figure 8:
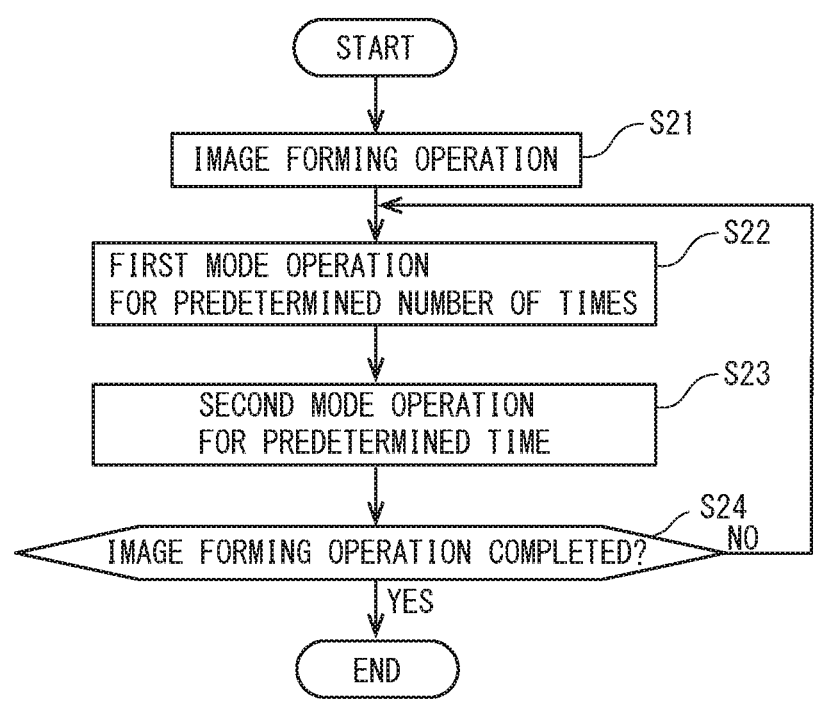
FIG. 8 is a flow diagram showing an operation of the exhaust device according to the modified example of the embodiment of the present disclosure.

The above embodiment shows an example where the second mode operation is started after a predetermined time elapses from the completion of the image forming operation. However, as shown in FIG. 8 (a flow diagram showing the operation of the exhaust device 20 according to the modified example), the first mode operation and the second mode operation may be repeated periodically during the image forming operation. Specifically, when the printer 1 starts the image forming operation (step S21), the controller 25 performs the first mode operation for a predetermined number of times during the image forming operation (step S22). Next, the controller 25 performs the second mode operation for a predetermined time (step S23). Next, the controller 25 determines whether the image forming operation is completed (step S24). When it is determined that the image forming operation is not completed (step S24: NO), the controller 25 returns the process to step S22. On the other hand, when it is determined that the image forming operation is completed (step S24: YES), the controller 25 completes the operation of the exhaust device 20. According to the configuration, the exhaust is performed frequently by repeatedly performing the first mode operation for a predetermined number of times and the second mode operation for a predetermined time during the image forming operation and, so that it becomes possible to suppress increasing of temperature of the inside of the casing 2 of the printer 1.

The above embodiment shows an example where the first fan 31 and the second fan 32 are provided inside the duct 21. However, the first fan 31 may be provided on the upstream side of an inlet port of the duct 21 and the second fan 32 may be provided on the downstream side of an outlet port of the duct 21.

The invention claimed is:

1. An image forming apparatus comprising:
   a duct;
   a filter provided inside the duct;
   a first fan provided on an upstream side of the filter in an exhaust direction; and
   a second fan provided on a downstream side of the filter in the exhaust direction, wherein
   a first mode operation containing a first operation in which the first fan sends air to the filter and a second operation in which the second fan sends air to the filter after the first operation is performed at least once, and then a second mode in which the first fan sends air in the exhaust direction is performed, wherein
   the first operation contains an operation in which the second fan sends air to the filter at wind force lower than the first fan, and
   the second operation contains an operation in which the first fan sends air to the filter at wind force lower than the second fan.

2. The image forming apparatus according to claim 1, wherein
   a collection space is formed between the first fan and the filter and between the filter and the second fan.

3. The image forming apparatus according to claim 1, wherein
   in the first mode operation, a time where the first operation is performed and a time where the second operation is performed are the same.

4. The image forming apparatus according to claim 1, wherein
   the first mode operation is started during an image forming operation, and the second mode operation is started after a predetermined time elapses after a completion of the image forming operation.

5. The image forming apparatus according to claim 4, comprising an operation part which receives an operation to change the predetermined time.

6. The image forming apparatus according to claim 1, comprising an image forming part operated by a user and a human detection sensor disposed near the image forming part, wherein the first mode operation is started during an image forming operation in the image forming part, and the second mode operation is started when the human detection sensor no longer detects the user after a completion of the image forming operation.

7. The image forming apparatus according to claim 1, comprising:

a fixing device which fixes a toner image transferred on a sheet to the sheet; and a casing in which the fixing device is stored, wherein the duct is formed along the exhaust direction from the fixing device to an outside the casing.

8. An image forming apparatus comprising:

a duct;

a filter provided inside the duct;

a first fan provided on an upstream side of the filter in an exhaust direction; and a second fan provided on a downstream side of the filter in the exhaust direction, wherein a first mode operation containing a first operation in which the first fan sends air to the filter and a second operation in which the second fan sends air to the filter after the first operation is performed at least once, and then a second mode in which the first fan sends air in the exhaust direction is performed, and the first mode operation is started during an image forming operation, and the second mode operation is started after a predetermined time elapses after a completion of the image forming operation.

9. The image forming apparatus according to claim 8, wherein a collection space is formed between the first fan and the filter and between the filter and the second fan.

10. The image forming apparatus according to claim 8, wherein the first operation contains an operation in which the second fan sends air to the filter at wind force lower than the first fan, and the second operation contains an operation in which the first fan sends air to the filter at wind force lower than the second fan.

11. The image forming apparatus according to claim 8, wherein the second fan does not send air in the first mode, and
the first fan does not send air in the second mode.

12. The image forming apparatus according to claim 8, wherein in the first mode operation, a time where the first operation is performed and a time where the second operation is performed are the same.

13. The image forming apparatus according to claim 8, comprising an operation part which receives an operation to change the predetermined time.

14. The image forming apparatus according to claim 8, comprising an image forming part operated by a user and a human detection sensor disposed near the image forming part, wherein the first mode operation is started during an image forming operation in the image forming part, and the second mode operation is started when the human detection sensor no longer detects the user after a completion of the image forming operation.

15. The image forming apparatus according to claim 8, comprising:

a fixing device which fixes a toner image transferred on a sheet to the sheet; and a casing in which the fixing device is stored, wherein the duct is formed along the exhaust direction from the fixing device to an outside the casing.

* * * * *